United States Patent [19]
Mark

[11] Patent Number: 5,435,784
[45] Date of Patent: Jul. 25, 1995

[54] MARINE DRIVE

[76] Inventor: Theodore Mark, 4409 Victoria Quay, Port Alberni, British Columbia, Canada, V9Y 6G1

[21] Appl. No.: 203,486

[22] Filed: Feb. 28, 1994

Related U.S. Application Data

[63] Continuation of Ser. No. 801,365, Dec. 2, 1991, abandoned.

[30] Foreign Application Priority Data

Jan. 25, 1991 [CA] Canada .................................. 2034927

[51] Int. Cl.$^6$ .............................................. F16D 3/50
[52] U.S. Cl. .............................. 464/74; 464/83; 464/182
[58] Field of Search ................ 464/73, 74, 76, 83, 464/89, 182

[56] References Cited

U.S. PATENT DOCUMENTS

| | | | |
|---|---|---|---|
| 1,552,892 | 9/1925 | Suppler | 464/74 |
| 1,974,356 | 8/1934 | Edwards | 464/83 |
| 2,891,395 | 6/1959 | Chater | 464/75 |
| 2,993,544 | 7/1961 | Carlson | 464/83 |
| 2,993,544 | 7/1961 | Carlson | 464/83 X |
| 3,045,763 | 7/1962 | Perrott | 464/83 |
| 3,411,323 | 11/1968 | Nehl | 464/74 |
| 3,645,114 | 2/1972 | Sheperd | 464/74 |
| 3,738,691 | 6/1973 | Firth | 287/52.06 |
| 3,884,049 | 5/1975 | Pauli | 464/73 |
| 4,121,532 | 10/1978 | Coryell III | 440/83 |
| 4,194,373 | 3/1980 | Jennings | 464/74 |
| 4,747,796 | 5/1988 | Iwai | 440/83 |

FOREIGN PATENT DOCUMENTS 763157 12/1956 United Kingdom .

*Primary Examiner*—Daniel P. Stodola
*Assistant Examiner*—Eileen A. Dunn
*Attorney, Agent, or Firm*—Oyen Wiggs Green & Mutala

[57] ABSTRACT

A marine drive for coupling a marine engine drive ring to a transmission drive shaft. A spider drive engages the drive ring and is provided with a plurality of rubber-cushioned trapezoidal lugs. The drive shaft is held in the spider drive by a central locking hub which is drawn tightly onto the drive shaft due to the tapered aperture in the spider drive. Wear-causing slippage of the drive shaft is thereby reduced.

4 Claims, 3 Drawing Sheets

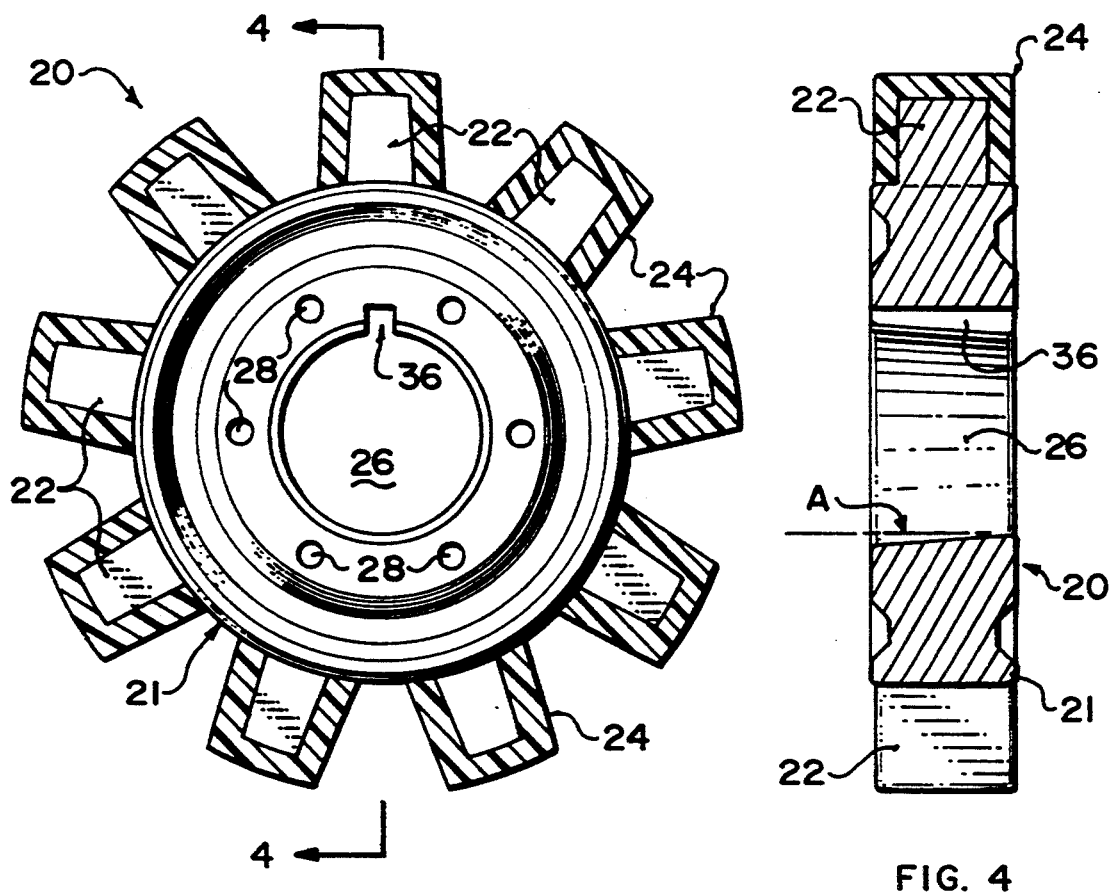
FIG. 3
FIG. 4
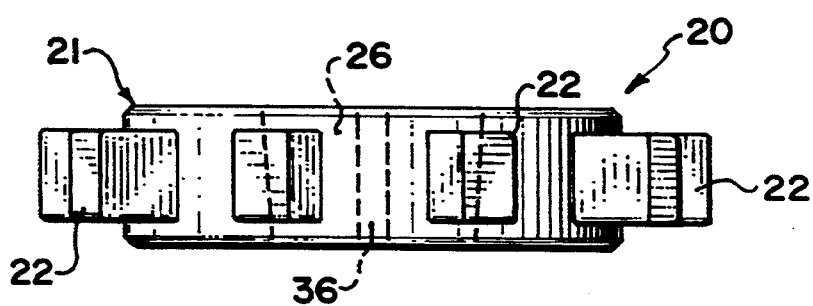
FIG. 5

MARINE DRIVE

This is a continuation application of application Ser. No. 07/801,365, filed Dec. 2, 1991, now abandoned.

FIELD OF THE INVENTION

The invention relates to drive media for marine engines, and more particularly to rubber-cushioned drive trains in marine engines which couple the engine to the transmission.

BACKGROUND OF THE INVENTION

In existing drive trains for marine engines, such as those using transmissions manufactured by Borg-Warner Automotive Inc. or Hurth Axle S.p.A., it is necessary to provide some cushioning of shock between the transmission and the engine drive plate. For example, Carlson U.S. Pat. No. 2,993,544 shows the use of rubber cushions to cushion shock between the drive shaft and a boat propeller of an outboard motor. Perrot U.S. Pat. No. 3,045,763 shows a similar arrangement in which the rubber cushions form blocks sitting on top of lugs or ribs. Shepherd U.S. Pat. No. 3,645,114 discloses a flexible rotary drive train in which there is a splined coupling having rubber cushions interposed between the splines. Other cushioned drivelines are shown in U.S. Pat. Nos. 1,552,892; 1,974,356; 3,411,323; 4,194,373; and 4,747,796.

In the past this cushioning of shock between the transmission and the engine drive plate has been most commonly accomplished by using a clutch-like drive ring mounted on the drive plate and which uses an array of springs to dampen shock. The drive shaft connected to the transmission has a splined end which fits into the complementary splines in the centre of the drive ring. As these splines wear, however, the fit becomes loose and the tendency to wear increases, eventually resulting in stripping of the splines and failure of the drive train.

A further solution to the drive problem has been the use of a drive ring which incorporates a "spider drive" having a number of lugs with rubber blocks which fit in corresponding slots in the drive ring. The rubber blocks absorb shock as between the engine and the transmission. These types of drive are manufactured by Twin Disc Inc. of Racine, Wis. Again, however, either a free-floating spline shaft, or a tapered shaft drawn into the centre of the spider drive by a bolt are used and wear problems can still persist. Also, the spider drive incorporates rectangular lugs within rubber blocks having a trapezoidal outer shape to conform to the drive ring. This causes uneven wear on the rubber blocks.

SUMMARY OF THE INVENTION

The present invention combines a cushioned spider drive and a locking centre hub to prevent any movement of the shaft in the drive. More particularly, the invention provides, in a driveline in Which an engine for providing a rotary power output is coupled to a drive shaft through a drive ring connected to the engine and having a central aperture for receiving a spider drive having radially-extending, shock-cushioning lugs, the improvement comprising providing in the spider drive a central tapered aperture and further providing a hub for receiving the drive shaft, the hub comprising a central extension having a tapered outer surface for co-operating with the tapered aperture of said spider drive, and means for drawing the central extension into the tapered aperture, the central extension comprising a central aperture for receiving said drive shaft and comprising at least two radially inwardly compressible sections.

BRIEF DESCRIPTION OF THE DRAWINGS

In drawings which illustrate a preferred embodiment of the invention:

FIG. 3 is an elevation view of the spider drive of the invention;

FIG. 4 is a cross-sectional view taken along lines IV—IV of FIG. 3;

FIG. 5 is a plan view of the spider drive shown in FIG. 3 with rubber lugs removed;

DETAILED DESCRIPTION OF THE PREFERRED EMBODIMENT

Figure 1:
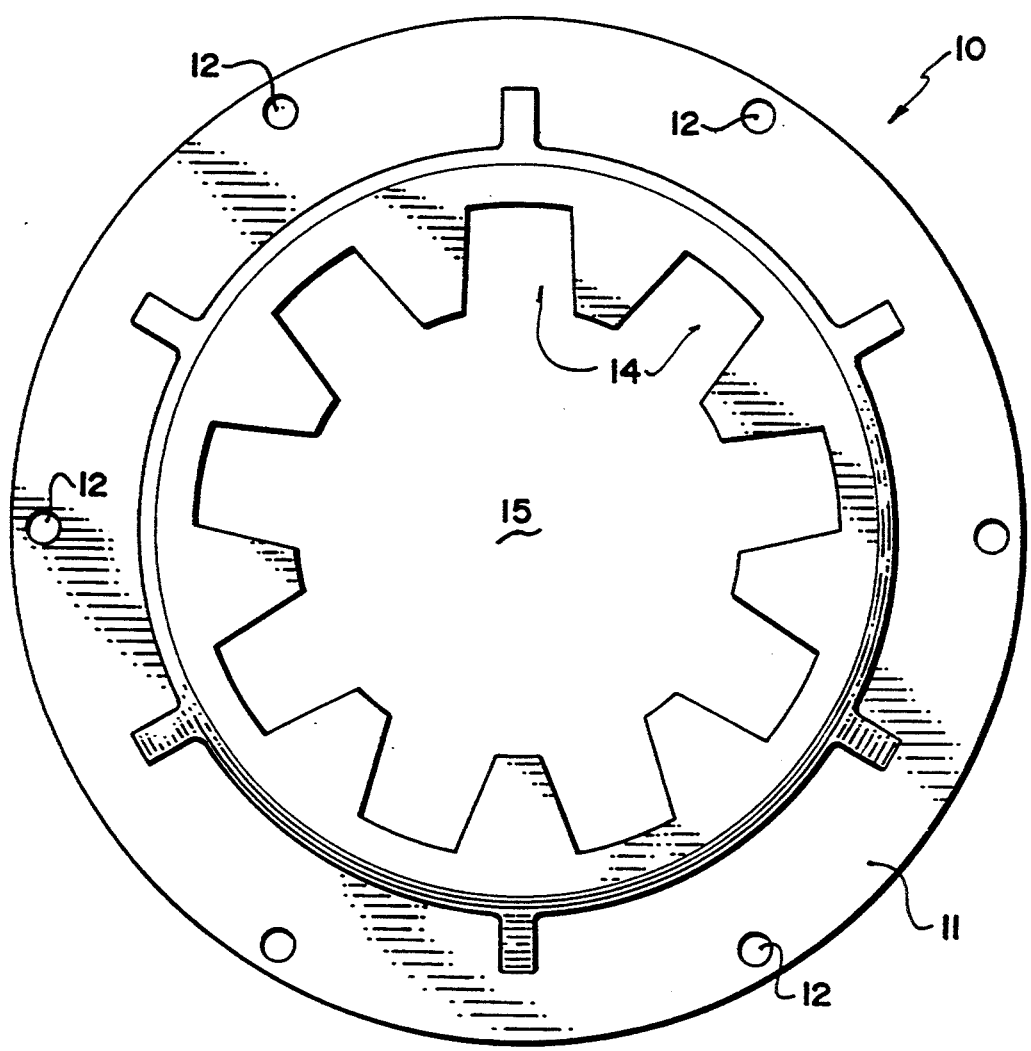
FIG. 1 is an elevation view of the drive ring of the invention.
Figure 2:
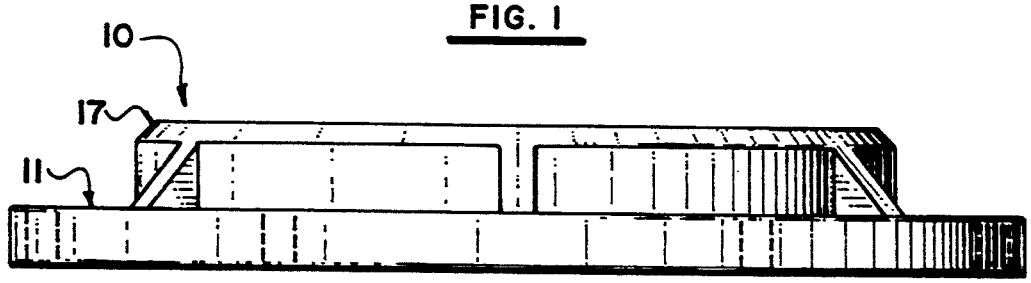
FIG. 2 is a plan view of the drive ring shown in FIG. 1.
Figure 6:
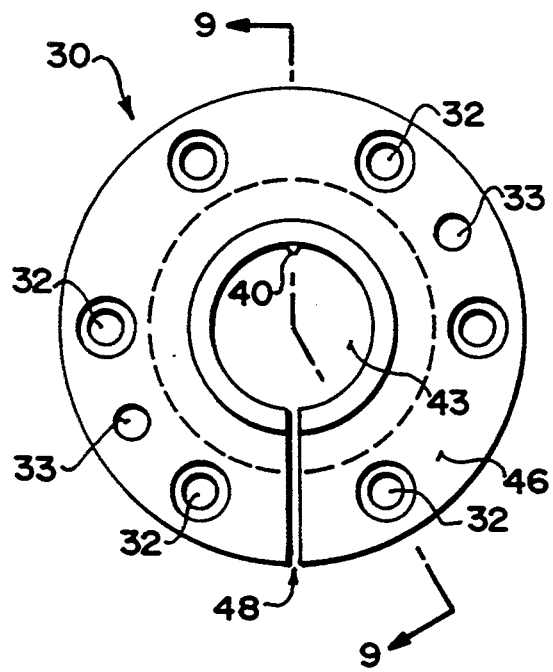
FIG. 6 is a front elevational view of the locking centre hub.
Figure 7:
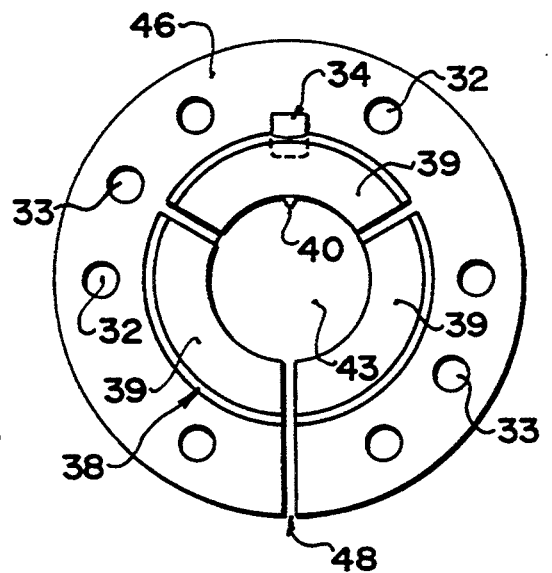
FIG. 7 is a rear elevational view of the locking hub shown in FIG. 6.
Figure 8:
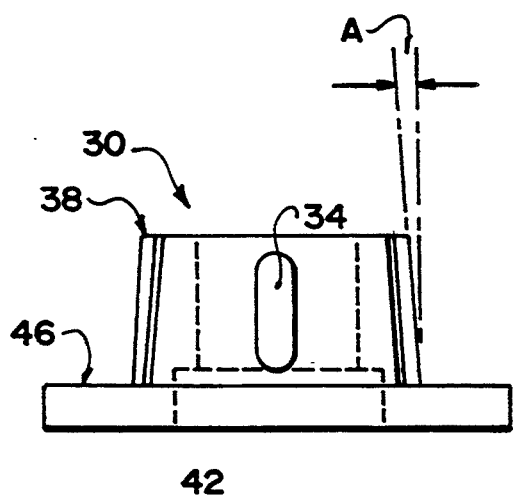
FIG. 8 is a plan view of the locking hub shown in FIG. 6.
Figure 9:
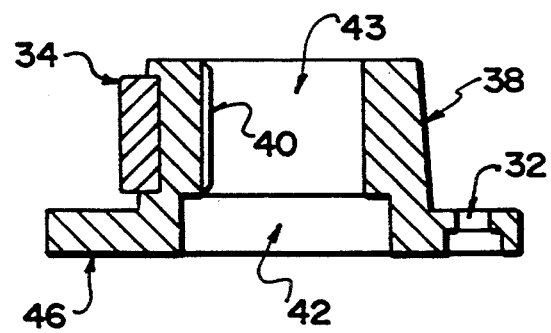
FIG. 9 is a cross-sectional view taken along lines IX—IX of FIG. 6.

With reference to the drawings, the drive ring of the invention, designated by numeral 10, has annular base 11 which is bolted to the marine engine drive plate through holes 12. Attached to base 11 is elevated ring 17. A central circular aperture 15 extends through base 11 and ring 17 and aperture 15 has radially extending trapezoidal notches 14. Aperture 15 receives the spider ring 20 and attached drive shaft (not shown).

The spider drive 20 has a central, circular, solid disk-like body 21 to which are fixed an array of radially-extending lugs 22 which are trapezoidal in profile. Mounted over each lug is a hollow rubber block 24, shown in cross-section in FIG. 3, which is also trapezoidal in profile to conform to the lug. The rubber-encased lugs 22 engage the drive ring in openings 14. By conforming the shape of the rubber blocks to the lugs, unlike the prior art in which rapid wear of the rubber blocks is a problem, the thickness of the rubber blocks is constant throughout the lug to prolong the life of the blocks. The body 21 of the spider drive may be constructed of a heavy metal, causing it to be quite massive and creating a flywheel effect which provides smoother operation of the engine at low trolling speeds.

As shown in FIG. 4 and in dotted outline in FIG. 5, the spider drive 20 has a central circular aperture 26 which tapers inwardly, at an angle A of approximately 2 and ½ degrees. Threaded holes 28 are provided to receive bolts from locking centre hub 30. Hub 30 has holes 32 through which bolts are directed to connect to holes 28 in spider drive 20 and by means of which the hub 30 is drawn into aperture 26 of the spider drive. Threaded puller holes 33 are used to screw in a bolt for assisting in removal of the hub from the spider drive. Key 34 fits in keyway 36 in the spider drive to properly align the hub 30.

Hub 30 consists of an annular ring 46, which is split at 48 and which has central circular hole 42, and co-axial cylindrical hub 38 which extends co-axially from ring 46 and is split into three arc-like sections 39. The three sections 39 form a circular hole 43 which extends into hole 42. The outer surface of cylindrical section 38 also is tapered to form an angle A with the line normal to the surface of ring 46 which is approximately 2 and ½ degrees. A spline 40 is formed on the inner surface of one of the sections 39 to mate with a corresponding groove on the drive shaft (not shown).

In operation, hub 30 is inserted into aperture 26 of spider drive 20 with key 34 aligned in keyway 36, so that tapered extension 38 conforms to the inner taper of aperture 26. The drive shaft (not shown) is then inserted into central hole 43 of hub 30 with spline 40 engaging the corresponding groove of the drive shaft. Bolts (not shown) are inserted through holes 32 into holes 28 and tightened to draw hub 30 further into aperture 26 and thereby draw sections 39 of the hub tightly together around the drive shaft. The spider drive is then inserted into the corresponding aperture 15 in drive ring 10. In this way the drive shaft is locked into the spider drive and wear-causing movement of the drive shaft is avoided, even if the drive shaft splines have been previously worn. All of the movement and resulting wear occurs in rubber blocks 24 which are readily replaced periodically.

While the drawings illustrate a spider drive having nine lugs, it will be apparent that a different number of lugs may be used, with corresponding changes in the drive ring. In fact the inventors' current preferred design utilizes twelve lugs on the spider drive as rubber fingers for that size lug are more readily available.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. In a driveline in which an engine for providing a rotary power output is coupled to a splined drive shaft through a drive ring connected to the engine and having a central aperture for receiving a spider drive having radially-extending, shock-cushioning lugs, the improvement comprising providing in said spider drive a central tapered aperture and further providing a hub for receiving said splined drive shaft, said hub comprises a central extension having a tapered outer surface for co-operating with said tapered aperture of said spider drive and an annular disc co-axial with said extension and provided with a first plurality of holes for receiving threaded fastening means for drawing said central extension into said tapered aperture, said central extension comprising a central cylindrical aperture for receiving said drive shaft having an inner surface and comprising an axially extending drive-shaft engaging spline forming a unitary part of and extending from the inner surface thereof and at least three slots extending radially therethrough and radially spaced from said drive-shaft engaging spline thereby forming at least three radially inwardly compressible sections, one of said radially extending slots extending from the inner surface of said central aperture to the outer circumference of said annular disc, and wherein said spider drive further comprises a second plurality of holes cooperating with said first plurality of holes for receiving said threaded fastening means.

2. The improvement of claim 1 wherein said spider drive comprises a central disc, a plurality of trapezoidal lugs extending radially from and connected to said disc, and resilient, hollow, trapezoidal lug covers provided on each said lug, said lug covers having parallel inner and outer surfaces.

3. The improvement of claim 1 wherein said spider drive is provided with an axially-extending keyway, and said hub is provided with an axially-extending key for mating with said keyway.

4. The driveline of claim 1 wherein said spider drive is provided with an axially extending keyway in the surface of said central tapered aperture, and said hub is provided on said tapered outer surface of said central extension with an axially extending key lying on the same radius as said spline, for mating with said keyway.

* * * * *